United States Patent
Savitzky et al.

(10) Patent No.: US 6,658,624 B1
(45) Date of Patent: Dec. 2, 2003

(54) METHOD AND SYSTEM FOR PROCESSING DOCUMENTS CONTROLLED BY ACTIVE DOCUMENTS WITH EMBEDDED INSTRUCTIONS

(75) Inventors: Stephen Savitzky, San Jose, CA (US); Gregory Wolff, Mountain View, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/303,818

(22) Filed: Apr. 30, 1999

Related U.S. Application Data

(63) Continuation-in-part of application No. 08/718,858, filed on Sep. 24, 1996, now Pat. No. 6,012,083.

(51) Int. Cl.$^7$ .............................................. G06F 15/00
(52) U.S. Cl. ...................... 715/513; 715/500; 715/514; 717/143
(58) Field of Search ................................. 707/513, 500, 707/530, 515, 531; 715/513, 514, 531, 500; 717/143, 139

(56) References Cited

U.S. PATENT DOCUMENTS

| | | | | |
|---|---|---|---|---|
| 5,649,215 A | * | 7/1997 | Itoh | 704/9 |
| 5,687,378 A | * | 11/1997 | Mulchandani et al. | 717/131 |
| 5,768,564 A | * | 6/1998 | Andrews et al. | 717/137 |
| 5,915,259 A | * | 6/1999 | Murata | 707/513 |
| 5,920,879 A | * | 7/1999 | Kyojima et al. | 707/517 |
| 5,924,104 A | * | 7/1999 | Earl | 715/501.1 |
| 5,956,726 A | * | 9/1999 | Aoyama et al. | 345/700 |
| 6,014,680 A | * | 1/2000 | Sato et al. | 707/513 |
| 6,038,573 A | * | 3/2000 | Parks | 707/513 |
| 6,078,924 A | * | 6/2000 | Ainsbury et al. | 707/101 |
| 6,085,196 A | * | 7/2000 | Motoyama et al. | 707/102 |
| 6,088,675 A | * | 7/2000 | MacKenty et al. | 704/260 |
| 6,098,071 A | * | 8/2000 | Aoyama et al. | 707/1 |
| 6,167,409 A | * | 12/2000 | DeRose et al. | 707/10 |
| 6,230,173 B1 | * | 5/2001 | Ferrel et al. | 707/501.1 |
| 6,253,228 B1 | * | 6/2001 | Ferris et al. | 709/203 |
| 6,256,631 B1 | * | 7/2001 | Malcolm | 707/10 |
| 6,266,681 B1 | * | 7/2001 | Guthrie | 715/501.1 |
| 6,266,683 B1 | * | 7/2001 | Yehuda et al. | 707/512 |
| 6,279,015 B1 | * | 8/2001 | Fong et al. | 707/513 |
| 6,286,000 B1 | * | 9/2001 | Apte et al. | 707/4 |
| 6,300,957 B1 | * | 10/2001 | Rao et al. | 345/441 |
| 6,507,856 B1 | * | 1/2003 | Chen et al. | 715/513 |
| 6,523,025 B1 | * | 2/2003 | Hashimoto et al. | 707/3 |
| 6,535,855 B1 | * | 3/2003 | Cahill et al. | 705/1 |

OTHER PUBLICATIONS

Henglein et al., Global Tagging Optimization by Type Inference, ACM 1992, pp. 205–215.*

Matzen et al., A Model for Studying Ambiguity in SGML Element Declarations, ACM 1993, pp. 668–676.*

(List continued on next page.)

*Primary Examiner*—Stephen S. Hong
*Assistant Examiner*—Cong-Lac Huynh
(74) *Attorney, Agent, or Firm*—Townsend, Townsend & Crew LLP

(57) ABSTRACT

An improved document processing system is provided by virtue of the present invention, wherein documents and processing associated with those documents are combined by structuring documents according to a common structure applicable to both the documents themselves and the processes that are applied to the documents. In one embodiment of a client-server document processing system in which the present invention is implemented, an agency is interposed between clients and servers, wherein the agency operates one or more agents which operate on documents which pass between the client and server. The agents are a set of active documents, where an active document is a structured document containing text and/or behavior. The active documents operate on a network in a context of strings, streams and parse trees, which allows programs to be embedded in documents, and since the documents are structured, the programs have the same syntax as documents. Furthermore, since documents are structured, their elements can be used as data structures.

17 Claims, 7 Drawing Sheets

OTHER PUBLICATIONS

Matzen et al., A New Tool for SGML with Applications for the World Wide Web, ACM 1998, pp. 752–759.*

Chang et al., A Graphical Environment for Change Detection in Structured Documents, IEEE, Aug. 1997, pp. 536–541.*

Friedman et al., Computer Structuring of Free–Text Patient Data, IEEE, Oct. 1983, pp. 688–691.*

Zheng et al., Text–Hypertext Mutual Conversion and Hypertext Interchange through SGML, ACM 1993, pp. 139–147.*

Newcomb et al., The "HyTime" Hypermedia/Time–based Document Structuring Language, ACM Nov. 1991, pp. 67–83.*

Ozsu et al., An Object–Oriented SGML/HyTime Compliant Multimedia Database Management System, ACM 1997, pp. 239–249.*

Salminen et al., From Text to Hypertext by Indexing, ACM 1995, pp. 69–99.*

* cited by examiner-

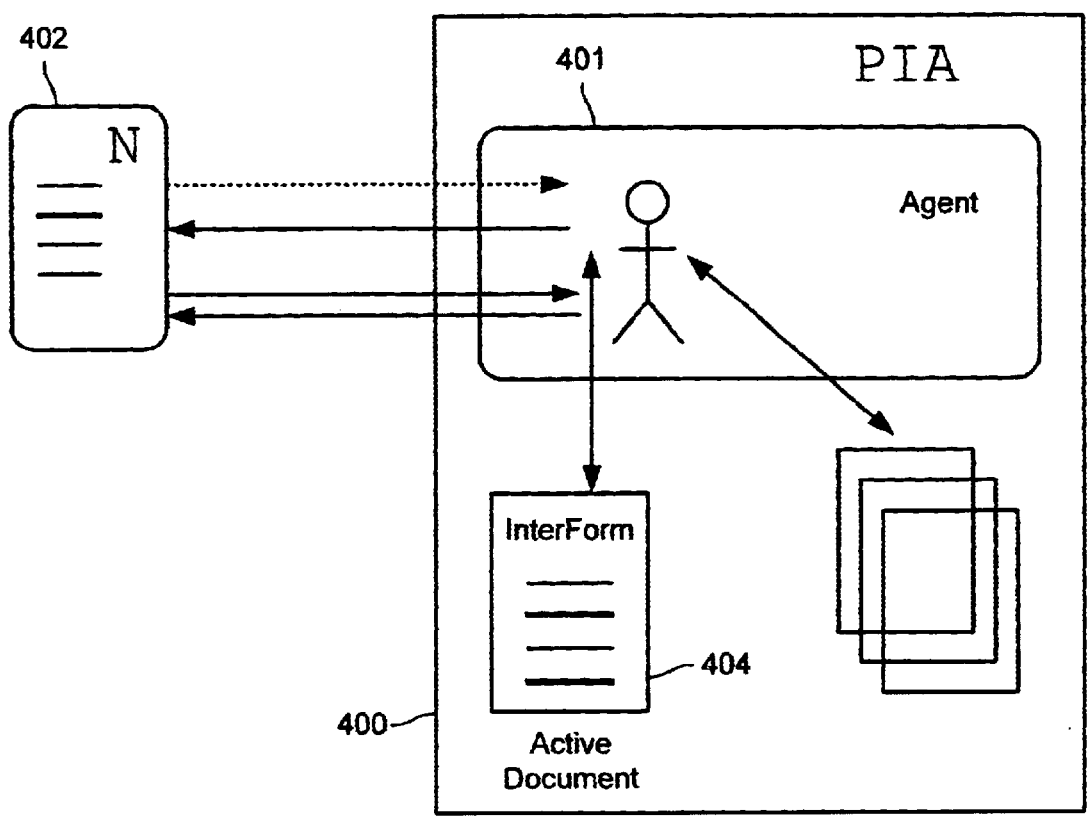

```
<if>&form.name;
   <then>Thank you. Your entry was:
   <b>name:</b> <tt>&form.name;</tt><br>
   <b>phone:</b> <tt>&form.phone;</tt><br>
   <write append file=phonebook.txt>&form.phone; &form.name;
   </write>
</then>
<else>Enter your name and phone number:
   <form method=GET action="&url">
      <b>name:</b><input value ="your name here" name=name><br>
      <b>phone:</b><input value ="your name here" name=name><br>
      <input type=submit>
   </form>
</else>
</if>
```

FIG. 3

Enter your name and phone number:

name: your name here phone: XXX-XXX-XXXX

SUBMIT

602

---

Thank you. Your entry:

name: Steve Savitzky phone: 415-496-5710

```
<actor tag="demo" quoted=1 dscr="show content,value of an element">
    <protect-result markup><get name="content"></protect-result>
    <b>=></b>
    <expand><get name="content"></expand>
</actor>
```

(b)

```
<demo><repeat list="a b c">&li;</repeat></demo>
```

(c)

```
<repeat list="a b c">&li; &li;</repeat>< = > 'a ab bc c'
```

(d)

```
<ol foreach list="a b c"><li> &li;</li></ol>
```

METHOD AND SYSTEM FOR PROCESSING DOCUMENTS CONTROLLED BY ACTIVE DOCUMENTS WITH EMBEDDED INSTRUCTIONS

CROSS REFERENCE TO RELATED APPLICATIONS

This application is a continuation-in-part of U.S. Pat. No. 6,012,083 (U.S. Pat. App. 08/718,858, filed Sep. 24, 1996 and entitled "DOCUMENT AGENCY SYSTEM"), which is incorporated herein by reference for all purposes.

COPYRIGHT NOTICE

A portion of the disclosure of this patent document contains material that is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of document processing. More specifically, one embodiment of the invention provides for an improved method and apparatus for processing documents, text and programs in a uniform and easily maintained manner.

With the growth of the Internet, the global network interconnecting many smaller computer networks and individual computers, many software development and distribution schemes take advantage of the fact that many people are connected together. For example, using programs written in the Java™ programming language developed by Sun Microsystems of Mountain View, Calif., U.S.A., a software provider can place one copy of a program on an Internet server and many Internet clients can run that program as if it were present on the client machine.

As used herein, an "Internet server" refers to a computer, or a collection of computers, which is connected to the Internet and responds to requests directed at the Internet server. An "Internet client" is a computer, or collection of computers, which is connected to the Internet and sends requests to an Internet server. In some cases, one computer or collection of computers may act as a client for one set of requests and as a server for another set of requests.

Several commonly used protocols exist for handling requests and responses to those requests depending on the nature of the request. For example, the File Transfer Protocol (FTP) is a protocol used by a client to request a file from a server. HyperText Transport Protocol (HTTP) is a protocol used by a client to request a hypertext document and used by a server to return requested documents as well as to transport server-initiated objects. Collectively, hypertext documents linked to other hypertext documents, when viewed using an HTTP browser, have been referred to as the "World Wide Web" or the "Web". These protocols typically operate on top of a lower level protocol known as the Transport Control Protocol/Internet Protocol (TCP/IP). Each of these protocols is well documented in existing literature and on the Internet, so they need not be described here in further detail.

The HTTP protocol has evolved from a protocol for transporting static, pre-existing hypertext documents to a protocol which allows for servers to generate hypertext documents on-the-fly based on the nature and parameters of the client's request, session "state" maintained by the server for that particular client, and many other varied factors. For example, instead of a request being directed to a static, pre-existing hypertext page stored on a server, the request could be directed to a script, such as a Common Gateway Interface (CGI) script. With such a script, a client sends the server a request that could specify either a static document or a script, but the server determines that the request is directed to a script and responds by executing the script and returning the output of the script as the request result.

FIG. 1 illustrates how such a scripting system might operate. FIG. 1 shows a browser 12 and a server 14, with server 14 on which a server supervisor 20 is executed. Server supervisor 20 handles I/O with browser 12 (which is a client in this example) and has access to one or more forms 22, CGI scripts such as script 24 and stores the output 26 of script 24 for transport to browser 12. Although not shown, it should be understood that a network or the Internet might be interposed between browser 12 and server 14.

FIG. 1 also shows the details of one such form 22 and script 24. In operation, browser 12 makes a request to server 14 a reference that is interpreted by server 14 to be a request for form 22. As shown, form 22 is a form for requesting a name and phone number from the user of browser 12. Form 22 is sent to browser 12, which presents the user with a suitable form to be filled out. Browser 12 presents form 22 according to the instructions contained in form 22. In this example, these instructions are in the form of HTML (HyperText Markup Language, a subset of the Standard Generalized Markup Language, or "SGML") tagged text.

In response to submission of the filled-out form, server 14 presents the filled-out form to script 24, which in this example is called "phone.cgi" and is referenced in form 22. Script 24 is written in a scripting language known as PERL. The output 26 of script 24 for a given form input, which can be determined with an understanding of PERL, is "Thank you. Your entry was:" followed by the name and phone number entered. The script also adds the entry to a file called "phonebook.txt".

One problem with this approach is that two different skill sets, and often two different sets of product developers, are needed to coordinate form development and script development. The forms developers, who may be technical writers familiar with HTML, need to coordinate with programmers writing PERL code so that the variable names and fields in the form match up with variable names and inputs in the script. Coordination is also needed for other languages, such as Java or C.

From the above it is seen that an improved method and apparatus which integrates documents and behavior (programs) associated with those documents is needed.

SUMMARY OF THE INVENTION

An improved document processing system is provided by virtue of the present invention, wherein documents and processing associated with those documents are combined by structuring documents according to a common structure applicable to both the documents themselves and the processes that are applied to the documents.

In one embodiment of a client-server document processing system in which the present invention is implemented, an agency is interposed between clients and servers, wherein the agency operates one or more agents which operate on documents which pass between the client and server. Each agent is a set of active documents, where an active document is a structured document containing text and/or behavior. An agent can also be thought of as a software object with behaviors specified by active documents.

The active documents operate on a network in a context of strings, streams and parse trees, which allows programs to be embedded in documents, and since the documents are structured, the programs have the same syntax as documents. Furthermore, since documents are structured, their elements can be used as data structures.

Applications of the document processing system include network office appliances over the Web using standard protocols and software agencies which combine client, server and proxy functions.

One advantage of active documents and the agency system is that client and server-specific software need only address low-level functions, as higher level functions can be implemented as active documents. With the active document language being the mode of development, document-oriented computing can be implemented easily, as a unified language is used to specify document content (data) and document processing (behavior).

Another advantage of an active documents-based document processing system is that the agents themselves are representable as active documents.

A further understanding of the nature and advantages of the inventions herein may be realized by reference to the remaining portions of the specification and the attached drawings.

BRIEF DESCRIPTION OF THE DRAWINGS

FIG. 3 shows the operation of a personal information agency in greater detail.

FIG. 4 depicts two browser displays.

FIGS. 6(a)–(e) are illustrations of input and output documents which might be processed by an active document interpreter.

Several appendices are included herewith. Appendix A explains the Standard Tagset used in one embodiment of an active document interpreter according to the present invention. Appendix B is a list of predefined entities as might be used as initial entities by the active document interpreter.

DESCRIPTION OF THE SPECIFIC EMBODIMENTS

The figures and the accompanying description below are examples of the preferred embodiment of the present invention and a few variations. A person of ordinary skill in the art will understand that many of the specific details of the embodiments shown here can be varied without departing from the novelty of the invention.

A document-oriented computing system looks like a network of agencies passing documents among themselves. An example of this is the Personal Information Agency (PIA) described in U.S. Pat. No. 6,012,083 (U.S. application Ser. No. 08/718,858, filed Sep. 24, 1996), which is commonly owned with the present application (hereinafter "Savitzky"). Savitzky is incorporated by reference herein for all purposes.

In such a system, input, output and storage devices become simple to deal with, as they are all just compound documents. Input devices are document sources, so they might appear from the perspective of an agent requesting a document from the input device to be a single document that is constantly being updated, an ever-expanding collection of documents, or a client that is constantly transmitting documents to one or more destinations. Output devices are document sinks, which might appear to be a document that can be updated, a constantly expanding collection of documents, or a client constantly requesting documents from one or more sources. Storage devices have aspects of both input devices and output devices, where documents can be sent to the storage devices and later retrieved.

The PIA apparatus disclosed in Savitzky can be used to implement document processing as will now be described, but it should be understood that other apparatus could be used in place of the PIA apparatus of Savitzky. Furthermore, the document processing described below can also be used with a document processing agency that does not have all of the components or functionality included in the PIA disclosed in Savitzky.

Figure 2:
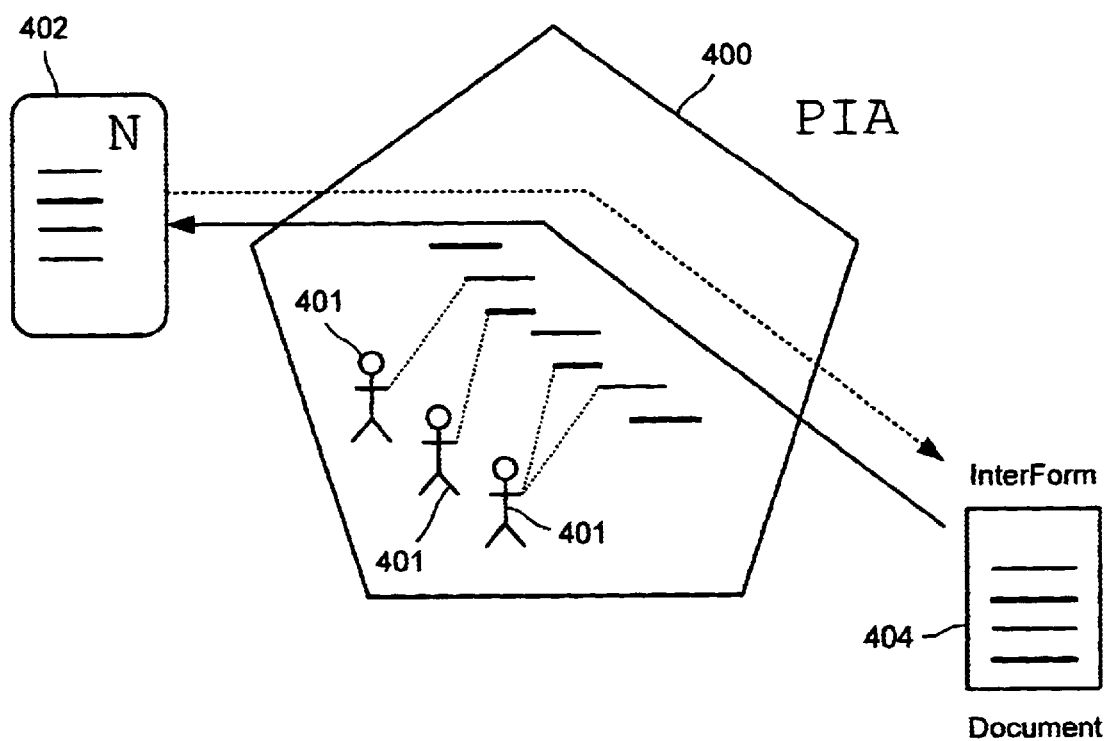
FIG. 2 is a block diagram of a personal information agency.

FIG. 2 is a block diagram of a personal information agency (PIA) which processes active documents. As shown, PIA 400 includes several agents 401 which act on active documents passing between a client 402 and a server (not shown) or other node in the network (not shown). The example client 402 used here is a browser, and as such, the active documents passed from client 402 are typically in the form of requests for documents or input results.

Figure 1:
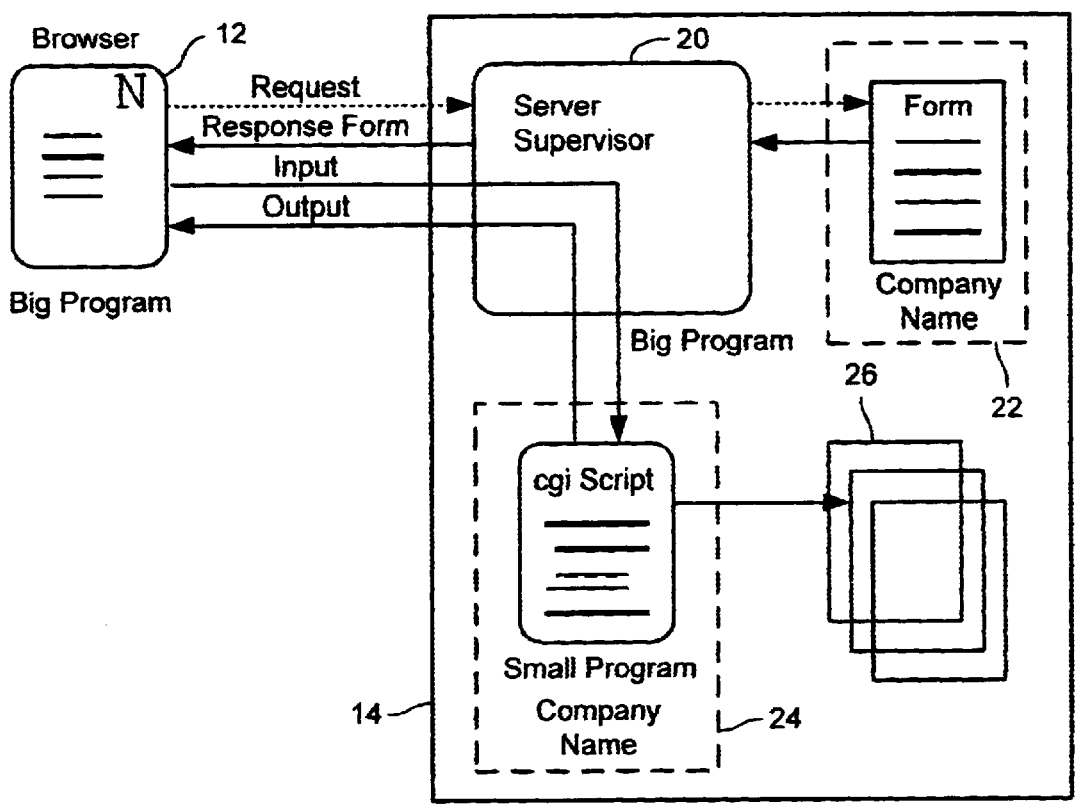
FIG. 1 is a block diagram of a document system using separate syntaxes for documents and programs.

Referring now to FIG. 3, the use of an active document in lieu of the form and script shown in FIG. 1 is there shown. Active document 404 is a document used by agent 401 to present a form for user input at browser 402 as well as to process that information when agent 401 receives it. FIG. 4 shows two browser displays 602, 604 where browser display 602 is the form as it would appear for user input and browser display 604 is the results of active document processing as would appear on the browser display as a result of submitting the form 602. Both displays are generated by the same active document 404.

Since behavior can be embedded in documents, the resulting single-component documents are easier to maintain, forms can be self-interpreting, tables and other data can be self-maintaining because they are being packaged in the same document as the code required to maintain them. Taking this to the next level, entire systems (e.g., agents) are implementable as collections of active documents not requiring anything else.

In a preferred embodiment, the active documents are HTML documents that may contain additional tags that follow SGML syntax conventions. This allows documents to be edited with a conventional text editor. In this "computing with documents" approach, data and methods are just pieces of an HTML document. For example, HTML lists (denoted by the <ul> and <ol> tags) are used by programs as lists or arrays. Definition lists (<dl> tags) double as associative arrays in that terms (<dt> tagged text) correspond to data (<dd> tagged text). Similarly, tables (<table> tags) can be used as database tables. This allows for use of existing text structures as program data.

In general, all data in an active document is in the form of SGML "elements" where an element is 1) a string of characters, 2) a start tag, 3) an end tag or 4) an entity reference. In the embodiment shown, a start tag comprises a "<" character, an identifier (the "tag"), a variable number of "attribute=value" pairs and a ">" character. An end tag comprises a "<" character, a tag and a ">" character. An entity comprises an "&" character, an identifier, and a ";" character. A construct that comprises a start tag, a matching end tag and its enclosed content is referred to as an "element". Tags and text are collectively referred to as "tokens". Strings of ordinary characters are referred to as text, while tags and entities are referred to as markup. Some operations operate only on text or only on markup. Entities are special notations, such as "©" in HTML to denote the copyright symbol, which are usable as variables or macros. As such, entities are definable, redefinable and expandable (i.e., they can be replaced with their current definition). Entities can also be used as "iteration variables". An example of a use of iteration variables is for embedding every item of a list in a block of text.

In the preferred embodiment, any subset of the tokens in a document can be associated with software objects referred to as "actors" to render them active. Each actor contains either SGML content or a reference to a primitive handle (subroutine). When an element, replaced by its content, is encountered in a document, the actor is expanded or the handle subroutine is invoked, with entities bound to the element's attributes and content. Actors can be collected together in groups referred to as "tagsets".

Actors are associated with tokens in either of two ways. An "active" actor has an entry in a hash table that associates it with the tag identifier of a corresponding element. If no active actor matches an element, each of a set of "passive" actors is examined in turn for a list of match criteria that test features (normally attributes) of the token. For example, the "if" actor is active and matches the start tag <if>. The "foreach" actor is passive, and matches any start tag that contains a "foreach" attribute. Another possible actor is the "_eval_perl_" actor, which is also passive and matches any start tag with a "language" attribute that has a value of "perl".

A PIA defines one standard tagset for use in with active documents, while some agents may define special tagsets to be loaded alongside the standard tagset. Completely different tagsets can also be defined for different kinds of document processing, such as parsing HTML, formatting, or even translating SGML documents with other document types into HTML.

The above concepts are closely related both to a programming language interpretation and to document formatting. Because of the dual nature of active documents, a technical writer might relate actors to macros and entities to abbreviations and the document evaluation process as a formatting or typesetting process, while a programmer might instead relate actors to functions and entities to variables.

Figure 5:
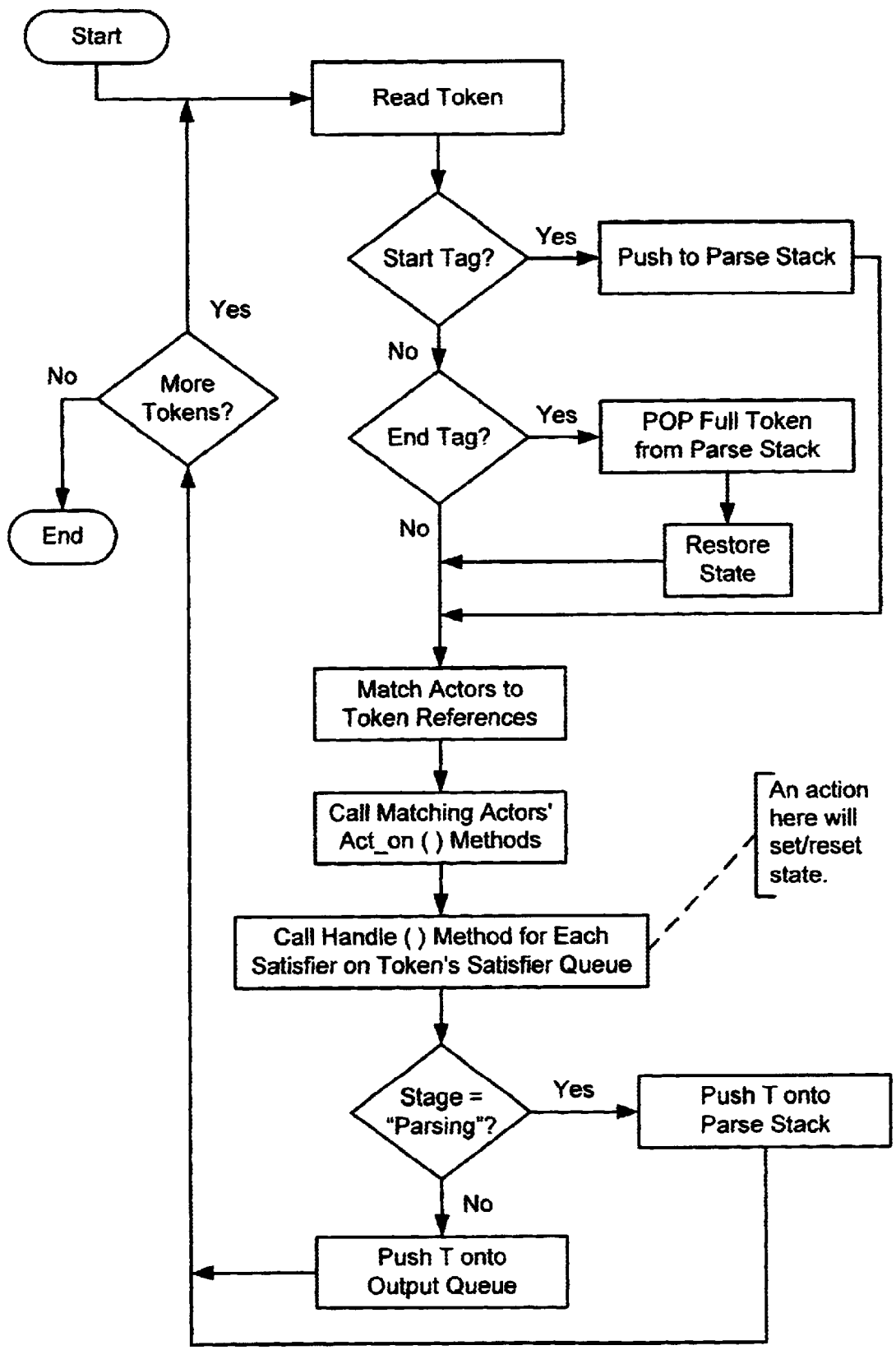
FIG. 5 is a flowchart of an active document interpretation process.

FIG. 5 is a flowchart of a generalized process that can be used to interpret active documents. The object that interprets active documents is referred to as an Active Document Interpreter (ADI). The ADI implements action and handle methods for most agents. The ADI processes an input document to form an output document and, in some cases, cause side effects other than the generation of the output document, such as the reading and writing of files.

The ADI comprises an input stack, a parse stack, an output queue, and a state memory containing the values for a current token T, a "streaming/parsing" flag, a "processing/quoting" flag, a current tagset, and a list of "handler" actors. Each item on the input stack is either a token or an object that returns the next token in a sequence of tokens. When a token is required, the ADI queries the top item on the input stack. If there are tokens available on the stack, the next token is requested; otherwise, it is popped and the next item is queried.

The input stack is normally initialized to include one token, a "scanner" object. The scanner object splits an input file or character stream into tokens. The input stack may also be initialized to contain an object that traverses a software representation of an element and returns the element's start tag, contents and end tag.

The ADI reads one token at a time from the input stack. A token can either be a start tag, an end tag, or a complete token, such as a string, an empty tag, an entity reference or a parse tree. Initially the process is in a streaming state where tokens are processed as they are received. The other state for the process is a parsing state. If the read token is a start tag, it is pushed onto a parse stack, along with the parsing/streaming flag and the quoting flag. If the read token is an end tag that matches the start tag on top of the parse stack, the top of the parse stack is popped and, if the state was "parsing" the current token is replaced. If the token is an end tag that does not match the top of the parse stack, it is pushed onto the input stack and the omitted end tag is generated as if it had not been omitted. The process goes back to the streaming state when the "streaming" flag is popped.

The current token T is then processed as follows. If the token is an entity reference and its value is defined in the current entity table, the token is replaced by its value (which is text, an element, or a list of tokens). Next, if T is a list of tokens or an element with content, it is pushed onto the input stack so that its start tag, content and end tag can be processed individually. Otherwise, if the token is not an entity reference or a list of tokens, it is a start tag, end tag, empty tag or text. If it is a start tag or empty tag, any entities in its attributes are expanded (i.e., replaced by their values).

Next, the token's tag identifier is looked up in the current tagset's table of active tags. If a matching actor is found, that actor's act_on( ) method is called with T and the ADI itself as parameters. Otherwise, the current tagset's list of passive actors is examined for actors with criteria that match the token T, and the act_on( ) methods of each such actor is called.

The act_on( ) methods may change the ADI's parsing/streaming and processing/quoting flags or replace the current token T with different token or null (deleting the token). The methods might also push one or more actors onto the "handler" list. After processing the act_on( ) methods, if the handler list is non-empty and the processing/quoting flag indicates processing, the handle method of each actor in the handler list is called. If the token T is still non-null at this point, the parsing/streaming flag is tested. If parsing, T is appended to the content of the token (element) on top of the parse stack. If streaming, it is appended to the output queue.

One consequence of the above procedure is that a document which is a passive document can be processed in the same manner as an active document, but the passive document will be simply processed and output (if the parsing/streaming flag is set to stream) or parsed and a parse tree generated (if the flag is set to parsing), while the active document will cause methods contained in the document to be executed. In the case of an active document containing actors, the processing is more involved.

An alternate implementation of the active document interpreter will now be described. In the alternate implementation, the input to the ADI is an iterator over a parse tree, where the parse tree is a collection of nodes and represents the input document. An example of a parse tree is described in the World Wide Web Consortium's Document Object Model (see, for example, <http://www.w3.org/TR/PR-DOM-Level-1/>).

The iterator is initialized to the root node of the document parse tree and the ADI can advance its input iterator to the next sibling node of the current input node or to the first child node of the current input node. The current input node is treated exactly the same as the current token in the first embodiment described above. An "end tag" condition is indicated by the absence of a next sibling node.

The output of the ADI is a parse tree constructor. The operations on such a constructor are to add a new child node to the current node, to add a new child node to the current node and make that new child the current, node, and to make the parent of the current node the new current node.

The ADI operates by recursively traversing its input tree. Ordinary (non-active) nodes are copied to the output tree. Active nodes are expanded by instantiating a new ADI with the same output as its "context", but with an iterator over the definition of the active node as its input. The attributes and contents of the original active node are bound to entity names accessible within the expansion.

Because the input iterator and output constructor only operate in a forward direction, it is possible to process a file by means of a parser that emulates such a traversal, without having to have the entire tree resident in the ADI at any one time. Similarly, the output constructor can output the external representation of each node it is passed, without having to construct an actual parse tree.

Other specialized input iterators and output constructors can be used for specific document-processing tasks, such as filtering. It will be apparent to one skilled in the art that many other equivalent implementations are possible, for example, translating each node in an active document's parse tree into an equivalent sequence of instructions in a programming language that outputs the desired expansion. In such an implementation, an active document is translated into a program in a first pass, then that program is executed to perform the processing operations in a second pass.

Details of the InterForm language developed by us for processing active documents will now be described, following the definition of a few terms used below.

Diverting incoming tokens is referred to as "parsing". As a result of parsing, the ADI constructs a compound object comprising the start tag and its content, which forms the complete element. The process of replacing an element, attribute, or entity with new data is referred to as "expanding" since the result is often, but not always, larger than the original. Allowing an actor to perform processing on an element is referred to as "applying" the actor to the element and associating an entity or attribute name with a value is referred to as "binding" the name to the value. A value may be anything from a single character to an entire document with markup. Processing a stream of incoming tokens (parsing, expanding, and applying actors) is referred to as "evaluating" the stream.

In the preferred embodiment described here, the syntax of the InterForm™ language begins with a base of HTML derived from the SGML reference syntax, so that an InterForm document can be parsed using an SGML parser having an appropriate Document Type Definition (DTD). If an HTML editor allows for non-standard entities and element tags, it would handle an InterForm document. An SGML validator, with an appropriate DTD can be used to validate the syntactic structure of an InterForm document.

Two slightly different kinds of names (identifiers) are used in an InterForm system. The first kind of name is for element tags and attributes, while the second is for entities. Element tag and attribute names are case insensitive and start with a letter and contain any sequence of letters, digits, "." (period) and "-" (hyphen) characters. Entity names use the same character set but are case sensitive. Where a name is a reference to a Uniform Resource Locator (URL) or a filename, the character set and format of the name are determined by an external set of rules applicable to URL's or filenames, for example, but are not constrained by the InterForm language.

Some actors, such as the "if" and "set" actors, correspond directly to tags. By convention, actors that do not correspond directly to tags should have names starting with a dash ("-") and preferably end with a dash. Dashes might also appear within actor names to separate words. Often the first word names the PIA data structure acted upon, as in "agent-running", which tests whether an agent with a given name is running.

Many actors, such as the "get" actor, accept a large variety of special attributes that modify their behavior, such as "<get entity>" and "<get actor>". Many specialized versions of actors exist with names like "get.entity", i.e., where the tag and the attribute are separated by a ".", which is somewhat more efficient to use, since less work has to be done by the ADI in figuring out which action to take. In fact, the "get" actor allows specification of data structures.

Entity references are defined as follows:

entity::='&' path ';'?

path::=identifier ['.' path]?

identifier:=[letter | digit |'-']+

In other words, an entity reference comprises an ampersand ("&") followed by a name, followed by a semicolon (";"). The semicolon can be omitted if a character that is not permitted in a name follows the name of the entity, but it is good practice to include it anyway. Case is significant in entity names. An entity name may comprise several sub-names separated by periods. These sub-names form a path (similar to a file path) through a sequence of "namespaces" (which may be Agents, <table> or <dl> elements, forms, and so on). If no namespace is given, the ADI will search through any locally defined entities (for example, the list element entity defined by the <repeat> tag) and the top-level (global) entity table associated with the active document being interpreted. If a path ends with a namespace, it is returned as a description list or query string, depending on the context.

By default, the locally defined entities include those shown in Table 1, as well as other locally defined entities as needed, such as the current date, day, time, and variables indentifying current agents, the current PIA and the current user. Several namespaces are defined ahead of time, such as the examples shown in Table 2.

TABLE 1

| Entity Name | Entity Description |
| --- | --- |
| agentName | Name of the agent owning this active document |
| agentNames | Names of all defined agents |
| agentType | Type of the agent owning this active document |
| entityNames | Names of all defined entities |
| fileName | Name of the file containing this active document |
| filePath | Path of the file containing this active document |
| piaDIR | Path of the directory in which PIA is installed |
| piaHOME | Home directory of the user executing the PIA |

TABLE 2

| Namespace | Description |
| --- | --- |
| AGENT | Namespace for the "options" of the PIA agent owning the active document being expanded |
| TRANS | Namespace for the headers and features of the current transaction (defining a new entity in the TRANS namespace will assert a feature if the feature's name is lowercase, and will assert a header if the name is capitalized) |
| LOCAL | Namespace associated with the innermost element that contains the entity being expanded (a new namespace is created if necessary) |
| GLOBAL | Namespace associated with the current document. Note that this namespace is actually a feature of the document's transaction, and so can be used for communication between agents |
| FORM | Namespace for the query string or form content associated with a GET or POST query |

```
element ::= start-tag [content end-tag]
start-tag ::= ' < ' tag [attribute]* ' > '
end-tag ::= ' ' < ' ' / ' tag ' > '
content ::= [text | element]*
tag ::= identifier
attribute ::= identitier [' = ' value]
value ::= identifier | nonblank* | quoted-string
quoted-string ::= quote non-quote* quote
quote := ' " ' | " ' "
identifier ::= [ letter | digit | ' - ' | ' . ' ] +
nonblank ::= any character except
  ' " ' | " ' " | ' < ' | ' > ' | whitespace
whitespace ::= any character with code <= ' '
```

An element which is just a start tag is called an "empty" element. Thus, empty elements can be identified by their tags. Typically, attributes and identifiers are separated by "=" but not intervening spaces.

In an advanced implementation, entity-style hierarchical lookup on actor tags is provided. This permits <dl> lists to function as objects. The order of attributes in a start tag is retained during processing, but is not significant for any of the predefined actors or for any of the standard HTML tags.

Several actors, such as the <repeat> actor described below, operate on lists. Lists are sequences of items usually represented by the <li> element. Lists function very much like arrays in conventional programming languages, or sets in database languages. The following elements are treated as simple lists:

<ul>, <ol>, <table>, <tr>

A <table> is actually a list of lists. In addition, a description list (<dl>) can be treated as a list of two-element (<dt>, <dd>) lists, or as a simple, flat list of alternating names and values. A text string, especially an attribute, can also be treated as a list, by splitting it on whitespace using the <split> actor. In fact, any sequence of tokens can be treated as a list, by splitting it either on whitespace, or on token boundaries.

An active document can also have associations. In an association, <dt> and <table> elements are treated as key= value associations. The key in a table is normally just the first item in the row, but rows with a blank first element (normally a <th> tag) are appended to the previous row. Tables with labeled columns (usually indicated by an initial row of <th> elements) can be turned into lists of associations.

In addition, any string in the proper form can be used as an association. Pairs can be separated by whitespace or "&" characters (as in query strings); names and values are normally separated by an "=" character. Ordinary lists are also usable as associations using the <associate> actor, which associates items in pairs. Any element can be turned into an association (of attributes and values), optionally with its tag and content associated with special keys, normally "-tag-" and "-content-", that cannot be mistaken for attributes. This is also done using the <associate> actor.

Each actor may have some associated on-line documentation strings which can be specified as attributes when the actor is defined (and eventually using elements inside the actor's body), such as those shown in Table 3, with examples of actors used to access an actor's documentation shown in Table 4.

TABLE 3

| Attribute | Use of Attribute |
| --- | --- |
| syntax | A regular-expression syntax description for the actor |
| dscr | A narrative description of the actor's semantics |
| note | Any additional information, in text form |
| doc | Full documentation, usually in HTML form |

The following actors are used to access an actor's documentation:

TABLE 4

| Actor Reference | Description |
| --- | --- |
| <actor-attrs name = actorX> | This actor returns the attributes of the actor named actorX which were specified in the <actor name = "actorX"> element that defined the actor actorX. Optionally, the documentation attributes of actorX are omitted. |
| <actor-dscr name = actorX> | This actor returns the actor description string for the actor actorX. The <add markup>actor can be used to convert capitalized names to boldface, and so on. |
| <actor-syntax name = actorX> | This actor returns the actor syntax string for the actor actorX. The <add markup> actor can be used to put the syntax string in into a suitable form for display. |
| <actor-doc attr = attrid name = actorX> | This actor is used to access documentation associated with the actor actorX. |

An example of the above concepts will now be described with reference to FIGS. 6(a)–(e). FIG. 6(a) is a section 802 of text which, when encountered in a document, instantiates an actor. Section 802 is shown comprising a start tag 804, instructions 806 and end tag 808.

Start tag 804 identifies the tag that activates the actor, which is "demo" in this case, as well as defining the attributes quoted and dscr. Instructions 806 comprise the content of the element 802 (FIG. 6(a)), which comprise the "demo" actor's definition. The instructions are executed (expanded) by the "demo" actor's "handle" method. As shown, instructions 806 provide for the output of the content with its markup unchanged (using the <protect-result markup></protect-result> tags), followed by a bolded "=>" and the expansion of the content.

FIG. 6(b) shows an input document 810 to be processed. As an ADI processes input document 810, it encounters the start tag <demo> and pushes the tag onto its parse stack, as explained above. The elements within the <demo> element are also pushed onto the parse stack until the end tag </demo> is encountered and then the <demo> element is expanded by invoking its "handle" method.

In processing the <demo> element, its definition's content, which is itself a <repeat> element, is then processed by the ADI by pushing it onto the ADI's input stack and binding the name "content" to the content of the <demo> element. Processing then continues from there. In processing the content of the <demo> element, the content is output and then the content is evaluated, as explained above in connection with FIG. 6(a). This results in the output document shown in FIG. 6(c). As the content is a <repeat> element, the element is first output unchanged and then it is expanded. Since the <repeat> element has a list attribute of "a b c" and the content of the <repeat> element is "&li; &li;", the resulting expansion of "&li; &li;" is a list item followed by a space followed by the list item again, and thus the resulting expansion of the <repeat> element is "a ab bc c". Note the recursive nature of the expansion. It should also be noted that each of the documents in FIGS. 6(a)–(c) are in the same format. For example, the output document shown in FIG. 6(c) could be passed as an input document to an ADI as is.

FIGS. 6(d)–(e) illustrate another example of the use of the demo actor. FIG. 6(d) shows an input document having an <ol> (ordered list) element, which has as its content a reference to a list item. In the recursive expansion of these elements, "<li>&li;" expands to "<li>" followed by the list item selected from the list attribute of the <ol> element, which has a value of "a b c". These tokens are then processed as regular HTML markup to form the output document shown in FIG. 6(e), which shows an ordered list of the tokens found in the value of the list attribute.

Figure 7:
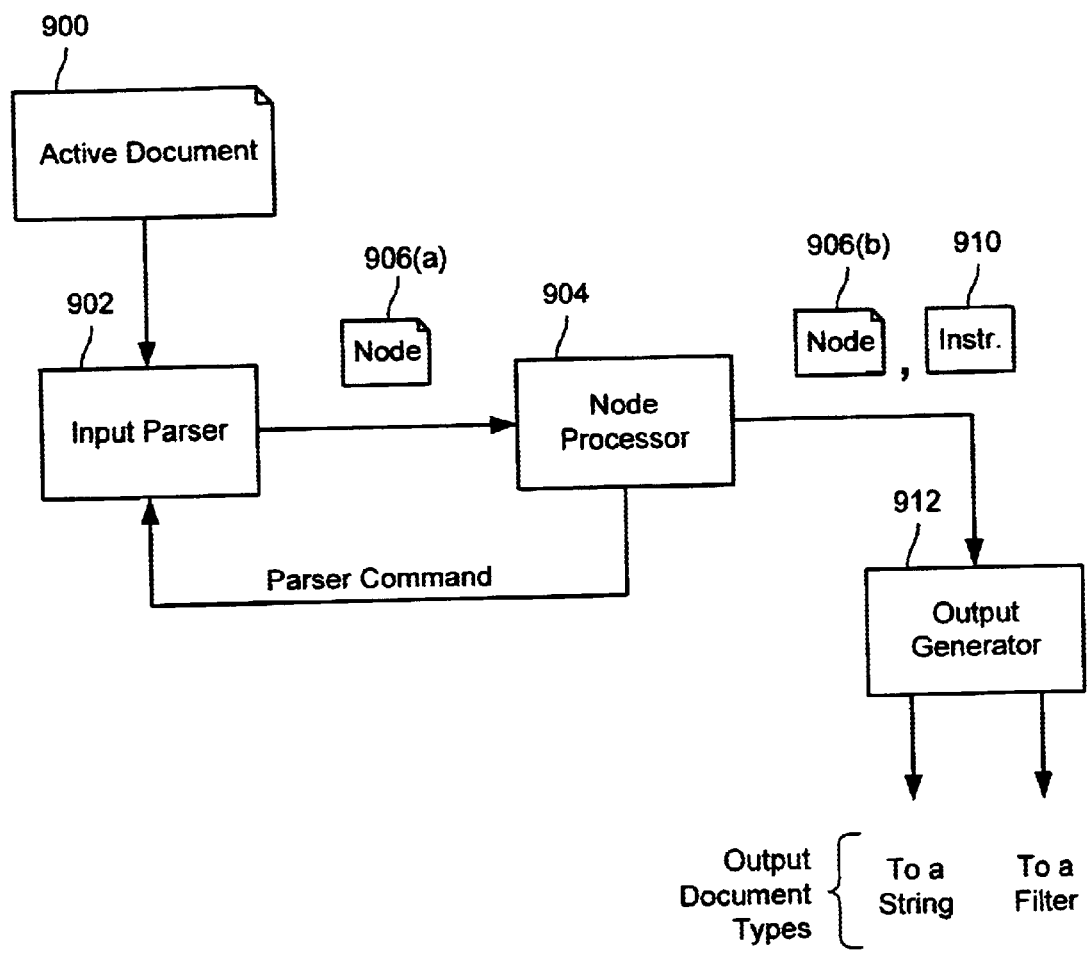
FIG. 7 is a block diagram of an alternate embodiment of an active document processor according to the present invention.

Referring now to FIG. 7, an alternate embodiment, or view, of an active document processor is there shown. The active document processor accepts an input document 900, which is preferably an active document, but can be any parsable document, and provides input document 900 to input parser 902. Input parser 902 is coupled to provide a current node 906(a) of input document 900 to a node processor 904.

Input processor is also coupled to receive various commands, described below, from node processor 904. Node processor 904 is coupled to an output generator 912 to provide a node 906(b), which is current node 906(a) or some result of processing current node 906(a), along with instructions 910 for handling node 906(b). In response to receipt of these nodes 906(b), output generator 912 outputs portions of the output document resulting from processing input document 900. This output could either be to a string construct (a string variable, a fixed length storage element, etc.) or to a filter (a pipe input, a streaming input, etc.)

The commands that node processor 904 issues to input parser 902 include:

move to next sibling node
move to first child node
move to parent node
tell whether a next sibling exists
tell whether a child exists
tell whether a parent exists
get current node's type
get current node's tag
get current node's atributes In response to the "move" commands, input parser 902 traverses the input document's tree and outputs the new current node, whereas in response to the "tell" or "get" commands, input processor 904 responds with the answer to the question. With this method of parsing, the input document can be arbitrarily large, since it does not need to be parsed in its entirety. In fact, a tree does not even need to be created.

Figure 8:
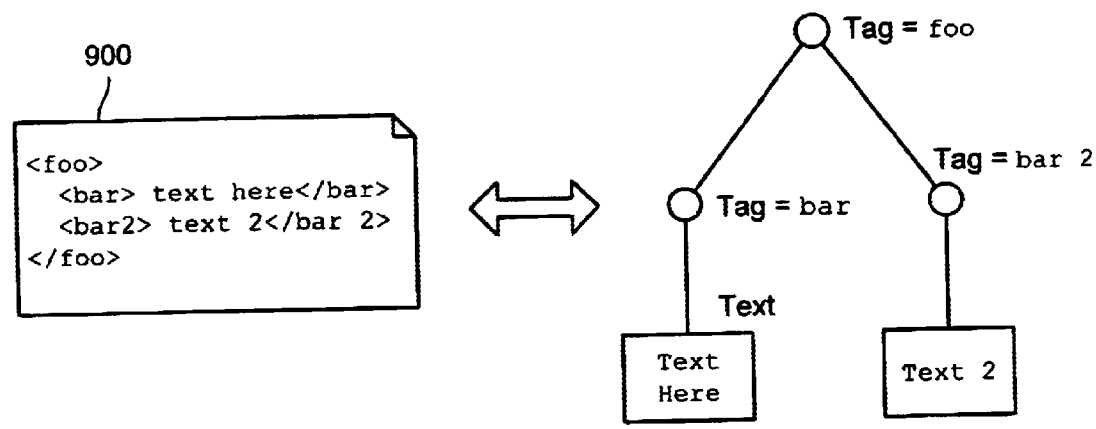
FIG. 8 is an illustration of a prase tree as might be generated for traversal by the input parser shown in FIG. 7.

As will be apparent from this disclosure, an entire document tree can be traversed with only parts of the document available, using only "move to next sibling", "move to first child" and "move to parent". FIG. 8 illustrates how a tree might be constructed from a structured document. Referring to FIG. 8, the three move commands might be viewed as "move right", "move down" and "move up", respectively. If issued in the correct order, a node processor could have all of the nodes passed to itself in turn, even if the input is a limitless (e.g., streaming) input document, because it is not necessary to store the entire tree of the document in storage local to the node processor. As shown by FIG. 8, a structured document 900 can be converted into a parse tree where the various elements encountered in structured document 900 are nodes of an input parse tree. In this example, the leaves of the tree are the text elements of input document 900.

Referring again to FIG. 7, instructions 910 can include:

output node
start (open) a new node
end a currently open node

Using these instructions, an output document can be created that is in the same format as the input document. It should be noted that, because the architecture shown in FIG. 7 provides for output documents in the same format (i.e., obeying the same constraints and conventions), node processors can be nested or chained. For example, the output of one parser-processor-generator might form the input to another parser-processor-generator. This might be preferred over a single parser-processor-generator when an intermediate, non-processing step is desired, such as storing a data structure for an intermediate processed active document. If the input document represents a program, it would be a program where the output of the program is in the same format as the program itself.

The above description is illustrative and not restrictive. Many variations of the invention will become apparent to those of skill in the art upon review of this disclosure. Merely by way of example, the ADI exists in both a standalone form for simple document processing tasks, and embedded in the PIA (personal information agency) system, where it is used for analyzing and modifying documents retrieved from the Internet or other sources, as well as for generating documents to be served directly to a user. The standalone ADI might be used, for example, to generate up-to-date documentation and examples for its own actors and tagsets. The scope of the invention should, therefore, be determined not with reference to the above description, but instead should be determined with reference to the appended claims along with their full scope of equivalents.

19
Appendix A.

Standard Tagset Manual

About This Manual:

This is the official manual for the Standard Tagset. It is available both as an active document, generated by an InterForm in the InterForm Demonstration agent, and as part of the InterForm Manual. In most cases, that will be faster, but is not always as up-to-date.

Contents

- Introduction
- Actor Definition and Control
- Expansion Control
- Name Bindings
- Control Structure
- Tests
- Numeric Processing
- List Processing
- String Processing
- OS Operations
- PIA Agents
- Actor Index
- Element Index

Introduction

Format

Each major section of this manual is set off by a horizontal rule, followed by a list of links to the individual actors described in it. Each actor description consists of a brief formatted description followed by an informal discussion.

Material that is less important (for example, implementation and design notes) is indented, like this.

The description consists of a definition list (<dl> element) with the following items:

Syntax

The formal syntax for a tag that invokes the actor, in ordinary extended-BNF notation. Optional attributes are enclosed in [square brackets]; alternatives are separated by "|". Regardless of the ordering of attributes in the syntax, attributes in an actual element can occur in any order.

Description

A brief text description, in which the names of the attributes are presented thus. (They are represented as all-uppercase words in the dscr attribute, and processed by <add-markup>.)

Definition

The start tag of an <actor> element which one would use to *define* the given actor. Note that the given handle attribute is a Java class name usually derived automatically from the actor's name.

See Also

A link to examples for this actor in examples.html.

The attributes in this tag are those that would be used to define the actor being described. This is followed by a brief text description in which the names of attributes in an *invocation* of the actor are presented in boldface. The special attributes element and content represent the entire invocation and its content, respectively. Actors with names that start with a letter match tags with that name; actors with names that start with a '-' have more complicated match criteria.

There is a slight ambiguity in the text description between an attribute and its associated value. It is usually clear from context.

The description strings come from the value of the dscr attribute of each actor; these are part of the *source code* that defines the actor, so they are usually the most up-to-date description available.

Lists

Many operations take a *list* of items, either in their content or as the value of an attribute. The list may consist of either:
- A sequence of non-blank text items or tagged elements separated by whitespace (including newlines).
- The list item (<li>) elements of an ordered (<ol>) or un-ordered (<ul>) list element.
- The row (<tr>) elements of a <table>
- The table data (<td>) and heading (<th>) elements of a table row (<tr>) element.
- The paired <dt> and <dd> elements of a definition list (<dl>) element.

In addition, some operations permit different item separators to be defined.

Associations

Some operations take a list of *associations*, or *pairs* of items. This may consist of either:
- An HTML query string consisting of key=value pairs separated by ampersand (&) characters.
- The paired <dt> and <dd> elements of a definition list (<dl>) element.
- A <table> element in which each row (<tr>) element is an association between its first data (<td>) or (more usually) heading (<th>) element and the rest of the row.

In addition, some operations permit different pair and key-value separators to be defined.

Actor Definition and Control

- <u>actor</u> -- <actor quoted handle="Actor" tag="actor" >
- <u>actor-attrs</u> -- <actor empty handle="Actor_attrs" tag="actor-attrs" >
- <u>actor-doc</u> -- <actor empty handle="Actor_doc" tag="actor-doc" >
- <u>actor-dscr</u> -- <actor empty handle="Actor_dscr" tag="actor-dscr" >
- <u>actor-names</u> -- <actor empty handle="Actor_names" tag="actor-names" >
- <u>actor-syntax</u> -- <actor empty handle="Actor_syntax" tag="actor-syntax" >
- <u>element</u> -- <actor empty handle="Element" tag="element" >

--- actor

Syntax:

```
<actor [quoted|literal|empty] [parsed|passed]
[name=ident] [tag=ident] [not-inside="tag list"]> content </actor>
```

Description:

define an InterForm actor.

Definition:

<actor quoted handle="Actor" tag="actor">

See Also:

Examples

Actor names and tags are not case-sensitive; an actor must have either a name or a tag attribute. Many operations that distinguish actors from ordinary elements (for example, the actor index in this document) rely on the presence of a dscr attribute to do so.

--- actor-attrs

Syntax:

```
<actor-attrs name="name">
```

Description:

get an actor's attributes in a format suitable for documentation.

Definition:

<actor empty handle="Actor_attrs" tag="actor-attrs">

See Also:

Examples

The documentation attributes (dscr, doc, syntax) are not returned by this operation; it is assumed that they will be retrieved by <<u>actor-dscr</u>>, <<u>actor-doc</u>>, and <<u>actor-syntax> respectively, and presented to the user in a different format.

actor-doc

Syntax:

```
<actor-doc name="name">
```

Description:

get an actor's doc attribute in documentation format.

Definition:

<actor empty handle="Actor_doc" tag="actor-doc">

See Also:

Examples

*This operation is presently unsupported in Release 0.9.*

The eventual hope is that it will contain the additional documentation provided in this manual.

actor-dscr

Syntax:

```
<actor-dscr name="name">
```

Description:

get an actor's dscr attribute in documentation format.

Definition:

<actor empty handle="Actor_dscr" tag="actor-dscr">

See Also:

Examples

Note that predefined actors (essentially, all those defined in this manual), get their dscr data from their handler class rather than from an attribute.

actor-names

Syntax:

```
<actor-names [tag=id]>
```

Description:

Return a list of the current actor names, optionally as an element with the given tag.

Definition:

<actor empty handle="Actor_names" tag="actor-names">

See Also:

Examples

This operation retrieves the names of the actors defined *at the point in the InterForm where it is invoked.* actor-syntax

Syntax:

```
<actor-syntax name="name">
```

Description:

get an actor's syntax attribute in documentation format.

Definition:

<actor empty handle="Actor_syntax" tag="actor-syntax">

See Also:

Examples

Note that predefined actors (essentially, all those defined in this manual), get their dscr data from their handler class rather than from an attribute.

element

Syntax:

```
<element tag=ident [empty] [not-inside="list of tags"]>
```

Description:

Define the syntax for an SGML element. Optionally empty. Optionally not-inside a list of tags which it implicitly ends.

Definition:

<actor empty handle="Element" tag="element">

See Also:

Examples

Expansion Control

- expand -- <actor parsed handle="Expand" tag="expand" >
- protect -- <actor quoted handle="Protect" tag="protect" >
- protect-result -- <actor parsed handle="Protect_result" tag="protect-result" > expand

Syntax:

```
<expand [protect [markup]]>content</expand>
```

Description:

Expand content, then either re-expand or protect it. Optionally protect markup as well.

Definition:

<actor parsed handle="Expand" tag="expand">

See Also:

Examples

Cause the content to be "expanded" (processed by the InterForm interpretor) a *second time* -- it will already have been processed "in place" once.

protect

Syntax:

```
<protect [markup]>content</protect>
```

Description:

Protect content from expansion. Optionally protect markup by converting special characters to entities.

Definition:

<actor quoted handle="Protect" tag="protect">

See Also:

Examples

Cause the content not to be "expanded" (processed by the InterForm interpretor) at all.

protect-result

Syntax:

```
<protect-result [markup]>content</protect-result>
```

Description:

Expand content and protect the result from further expansion. Optionally protect markup by converting special characters to entities.

Definition:

<actor parsed handle="Protect_result" tag="protect-result">

See Also:

Examples

This protects, not content, but the result of *expanding* content. It can be used, for example, to prevent further processing of a file or computed text that contains markup. It is worth noting that <protect> and <protect-result> perform the same operation (namely, replace the actor element with its content); the only difference is whether the content is expanded while it is being parsed.

Name Bindings

- get -- <actor empty handle="Get" tag="get" >
- set -- <actor parsed handle="Set" tag="set" > get

Syntax:

```
<get [name="name"]
[pia|agent|form|trans|env|element[tag=tag]|local|global
| [file="filename"|href="url"|[file|href] name="string" ] >
```

Description:

Get value of name, optionally in pia, env, agent, form, element, transaction, or local or global entity context. Default is to start with the local entity table and move up the stack until name is found. Returns "" if name does not exist in specified context. Elements of complex data structures can be accessed using a dotted notation "foo.bar" return the bar element of foo. Default is the generic lookup that includes paths. If file or href specified, functions as <read>.

Definition:

<actor empty handle="Get" tag="get">

See Also:

Examples set

Syntax:

```
<set name="name" [copy]
 [ pia | agent [hook] | trans [feature] | env
 | [element [tag=ident] | entity [global | local] ]>...</set>
```

Description:

set name to content, optionally in pia, agent, transaction, environment, element, or entity context. entity may define a local or global binding. Default is to replace the lowest current binding and create global binding if none exists. element may have a tag. transaction item may be feature. agent may be a hook (parsed InterForm) or string. Optionally copy content as result.

Definition:

<actor parsed handle="Set" tag="set">

See Also:

Examples

---

Control Structure

- if -- <actor parsed handle="If" tag="if" >
- then -- <element quoted name="then" tag="then" >
- else -- <element quoted name="else" tag="else" >
- foreach -- <actor quoted handle="Foreach" tag="foreach" >
- -foreach- -- <actor quoted handle="foreach_" match="foreach" >
- repeat -- <actor quoted handle="Repeat" tag="repeat" >

--- if

Syntax:

```
<if><test>condition</test><then>...</then><else> ;...</else></if>
```

Description:

If test non-null, expand then, else else.

Definition:

<actor parsed handle="If" tag="if">

See Also:

Examples then

Definition:

<element quoted name="then" tag="then"> else

Definition:

<element quoted name="else" tag="else"> foreach

Syntax:

```
<foreach list="list" [entity=ident]>element</>
```

Description:

Repeat content for each entity (default &li;) in list. Return the repeated content.

Definition:

<actor quoted handle="Foreach" tag="foreach">

See Also:

Examples

When <<u>foreach</u>> is a *tag* rather than an attribute, only the content, of the <<u>foreach</u>> element is returned, unlike the entire element as with the *attribute* foreach.

-foreach-

Syntax:

```
<... foreach list="list" [entity=ident]>element</>
```

Description:

Repeat content for each entity (default &li;) in list. Return the entity.

Definition:

<actor quoted handle="foreach_" match="foreach">

See Also:

Examples

When foreach is an *attribute* rather than a tag, the element that contains it is returned rather than just its content, as with the *tag* <<u>foreach</u>>.

28
repeat

Syntax:
```
<repeat list="..." [entity="name"]>...</repeat>
```
Description:

Repeat content with entity (default &li;) in list. Return the repeated content

Definition:

\<actor quoted handle="Repeat" tag="repeat"\>

See Also:

Examples

<repeat> is just a synonym for <foreach>, but at some point some additional functionality will be added.

---

Tests

- test -- <actor parsed handle="Test" tag="test" >
- equal -- <actor parsed handle="Equal" tag="equal" >
- sorted -- <actor parsed handle="Sorted" tag="sorted" >

--- test

Syntax:
```
<test [iftrue="value"] [iffalse="value"] [not] [text|link]
[zero|positive|negative|null|match="pattern" [exact] [case]]>
```
Description:

Test content; return null or iffalse if false, else '1' or iftrue. Tests: default (non-whitespace), zero, positive, negative, null, match=*'pattern'*. Modifiers: not, case (sensitive), text, link, exact (match).

Definition:

<actor parsed handle="Test" tag="test"\>

See Also:

Examples

Performs a test specified by the attributes, on the content of the <test> element. With no attributes, a content consisting only of whitespace, HTML comments, and SGML declarations is considered *false*; anything else is *true*.
The following attributes modify the *result* of the test, which is normally null for a *false* result and "1" for *true*:

not reverses the *true* and *false* results.

**iffalse="*string*"**

return *string* if the result of the test is *false*.

**iftrue="*string*"**

return *string* if the result of the test is *true*.

equal

Syntax:

```
<equal [not] [case] [text] [numeric]>list...</equal>
```

Description:

Test list items in content for equality; return null or iffalse if false, else '1' or iftrue. Modifiers: not, case (sensitive), text, numeric.

Definition:

\<actor parsed handle="Equal" tag="equal"\>

See Also:

Examples

Tests the list items in the content for equality. Normally the test is for string equality ignoring case. The following attributes modify the test:

case (sensitive)

treat upper- and lower-case letters as different.

text

Only compare the text portion of the content and ignore the markup.

numeric

Compare the text of the items numerically. Items that do not begin with something that can be parsed as a number are compared as zero.

The following attributes modify the *result* of the test, which is normally null for a *false* result and "1" for *true*:

not reverses the *true* and *false* results.

**iffalse="*string*"**

return *string* if the result of the test is *false*.

**iftrue="*string*"**

return *string* if the result of the test is *true*.

sorted

Syntax:

```
<sorted [case] [text] [numeric] [reverse]>item, ...</sorted>
```

Description:

Test whether items in content are sorted. Optionally case (sensitive), text, numeric, reverse.

Definition:

<actor parsed handle="Sorted" tag="sorted">

See Also:

Examples

Tests the list items in the content for sortedness. Normally the test is for string (lexical) comparison in ascending order, ignoring case. The following attributes modify the test:

case (sensitive)

treat upper- and lower-case letters as different.

text

Only compare the text portion of the content and ignore the markup.

numeric

Compare the text of the items numerically. Items that do not begin with something that can be parsed as a number are compared as zero.

reverse

Test for the items being in *descending* order.

The following attributes modify the *result* of the test, which is normally null for a *false* result and "1" for *true*:

not reverses the *true* and *false* results.

iffalse="*string*"

return *string* if the result of the test is *false*.

iftrue="*string*"

return *string* if the result of the test is *true*.

Numeric Processing

- sum -- <actor parsed handle="Sum" tag="sum" >
- difference -- <actor parsed handle="Difference" tag="difference" >
- product -- <actor parsed handle="Product" tag="product" >
- quotient -- <actor parsed handle="Quotient" tag="quotient" > sum

Syntax:

```
<sum>n1 n2 ... </sum>
```

Description:

Return sum of numbers in content.

Definition:

<actor parsed handle="Sum" tag="sum">

See Also:

Examples

Takes a list of numeric values in content and replaces them with their sum. Markup is quietly ignored, as is any list item that cannot be interpreted as a number.

difference

Syntax:

```
<difference>n1 n2 ... </difference>
```

Description:

Return difference of numbers in content

Definition:

<actor parsed handle="Difference" tag="difference">

See Also:

Examples

Takes a list ($n1$, $n2$, ...) of numeric values in content and replaces them with their (left-associated) difference ($n1 - n2 - $...). Markup is quietly ignored, as is any list item that cannot be interpreted as a number.

product

Syntax:

```
<product>n1 n2 ... </product>
```

Description:

Return product of numbers in content

Definition:

<actor parsed handle="Product" tag="product">

See Also:

Examples

Takes a list of numeric values in content and replaces them with their product. Markup is quietly ignored, as is any list item that cannot be interpreted as a number.

quotient

Syntax:

```
<quotient>n1 n2 ... </quotient>
```

Description:

Return difference (n1/n2/...) of numbers in content.

Definition:

<actor parsed handle="Quotient" tag="quotient">

See Also:

Examples

Takes a list (*n1, n2,* ...) of numeric values in content and replaces them with their (left-associated) quotient (*n1 / n2 /* ...). Markup is quietly ignored, as is any list item that cannot be interpreted as a number.

List Processing

- sort -- <actor parsed handle="Sort" tag="sort" > sort

Syntax:

```
<sort [case] [text] [numeric] [reverse]>item, ...</sort>
```

Description:

Sort items in content. Optionally case (sensitive), text, numeric, reverse.

Definition:

<actor parsed handle="Sort" tag="sort">

See Also:

Examples

String Processing

- add-markup -- <actor parsed handle="Add_markup" tag="add-markup" >
- pad -- <actor parsed handle="Pad" tag="pad" >
- trim -- <actor parsed handle="Trim" tag="trim" > add-markup

Syntax:

```
<add-markup>text</add-markup>
```

Description:

Add markup to text content using common conventions.

Definition:

<actor parsed handle="Add_markup" tag="add-markup">

See Also:

Examples

Add markup to a text string (content type text/plain), using conventions commonly used in e-mail, Usenet news, and programming. Particularly useful for strings meant to go into attributes, since some browsers and HTML parsers choke on markup inside attributes.

Originally developed for the descriptions in the dscr attributes of actors.

pad

Syntax:

```
<pad width=N [align=[left|right|center]] [spaces]>...</pad>
```

Description:

Pad content to a given width with given alignment (left/center/right). Optionally just generate the spaces. Ignores markup.

Definition:

<actor parsed handle="Pad" tag="pad">

See Also:

Examples

Add spaces to content to fill it out to a specified number of spaces. <pad> can be useful for generating tables to be presented using the <pre> tag, which is supported by *all* browsers (unlike <table>, which some older browsers still don't support very well). Used, for example, on the PIA's agent index.

trim

Syntax:

```
<trim [all]>content</trim>
```

Description:

Eliminate leading and trailing (optionally all) whitespace from content. Whitespace inside markup is not affected.

Definition:

<actor parsed handle="Trim" tag="trim">

See Also:

Examples

Essentially the opposite of <pad>; useful for cleaning up indentation and line breaks inserted to make InterForm code easier to read in source form. Note that spaces, tabs, and HTML comments are all considered whitespace.

OS Operations

- os-command -- <actor parsed handle="Os_command" tag="os-command" >
- os-command-output -- <actor parsed handle="Os_command_output" tag="os-command-output" >
- read -- <actor empty handle="Read" tag="read" >
- write -- <actor parsed handle="Write" tag="write" > os-command

Syntax:

```
<os-command [bypass]>command</os-command>
```

Description:

Execute content as an operating system command in the background with proxies set to pia. Optionally bypass proxies.

Definition:

<actor parsed handle="Os_command" tag="os-command">

See Also:

Examples os-command-output

Syntax:
```
<os-command-output [bypass]>command</os-command-output>
```

Description:

Execute content as an operating system command and capture its output. Optionally bypass proxies.

Definition:

<actor parsed handle="Os_command_output" tag="os-command-output">

See Also:

Examples

--- read

Syntax:
```
<read [ file="name" [interform [agent="agentName"]]
[info|head|directory [links] [tag=tag] [all|match="regexp"]]
| href="url" [resolve] ]
[base="path"] [process [tagset="name"]] >
```

Description:

Input from file or href, with optional base path. file may be looked up as an interform in current or other agent. Optionally read only info or head. For directory, read names or links, and return tag or ul. directory can read all names or those that match; default is all but backups. Optionally process with optional tagset. href can optionally resolve in pia.

Definition:

<actor empty handle="Read" tag="read">

See Also:

Examples

--- write

Syntax:
```
<write [file="name" [interform] [append] | href="url" [post]]
[base="path"] [trim] [line]
[copy [protect [markup]]] >content</write>
```

Description:

Output content to file or href, with optional base path. file may be looked up as an interform. base directory is created if necessary. Optionally append or post.

Optionally trim leading and trailing whitespace. Optionally end line. Optionally copy content to InterForm.

Definition:

<actor parsed handle="Write" tag="write">

See Also:

Examples

PIA Agents

- agent-home -- <actor empty handle="Agent_home" tag="agent-home" >
- agent-install -- <actor parsed handle="Agent_install" tag="agent-install" >
- agent-list -- <actor empty handle="Agent_list" tag="agent-list" >
- agent-options -- <actor empty handle="Agent_options" tag="agent-options" >
- agent-remove -- <actor empty handle="Agent_remove" tag="agent-remove" >
- agent-running -- <actor empty handle="Agent_running" tag="agent-running" >
- agent-set-options -- <actor parsed handle="Agent_set_options" tag="agent-set-options" >

Note:

Some of these actors were defined before more general mechanisms were developed. They are still useful, however, since they are usually shorter and faster than the general method.

agent-home

Syntax:

```
<agent-home name=ident [link]>
```

Description:

Return path to a pia agent's home InterForm. Agent name defaults to the name of the current agent. Optionally make a link. Very kludgy.

Definition:

<actor empty handle="Agent_home" tag="agent-home">

See Also:

Examples agent-install

Syntax:

```
<agent-install name=ident [type=ident]>...</agent-install>
```

Description:

Install an agent with given name and type. content is options form. Returns the agent's name.

Definition:

<actor parsed handle="Agent_install" tag="agent-install">

See Also:

Examples

--- agent-list

Syntax:
```
<agent-list [type=type] [subs]>
```

Description:

List the agents with given type. Possibly subs only.

Definition:

<actor empty handle="Agent_list" tag="agent-list">

See Also:

Examples

--- agent-options

Syntax:
```
<agent-options [name="agent-name"]>
```

Description:

Returns list of option names for agent name.

Definition:

<actor empty handle="Agent_options" tag="agent-options">

See Also:

Examples

--- agent-remove

Syntax:
```
<agent-remove name="agent-name">
```

Description:

Remove (uninstall) the agent with the given name.

Definition:

<actor empty handle="Agent_remove" tag="agent-remove">

See Also:

Examples agent-running

Syntax:

<agent-running name="*agent-name*">

Description:

Tests whether the agent with the given name is running.

Definition:

<actor empty handle="Agent_running" tag="agent-running">

See Also:

Examples agent-set-options

Syntax:

<agent-set-options [name="*agent-name*"]>options</agent-set-options>

Description:

Sets content as options for agent name.

Definition:

<actor parsed handle="Agent_set_options" tag="agent-set-options">

See Also:

Examples

Actor Index

- -foreach- -- <actor quoted handle="foreach_" match="foreach" >
  <... foreach list=*"list"* [entity=*ident*]>element</>

39
- actor -- <actor quoted handle="Actor" tag="actor" >
  <actor [quoted|literal|empty] [parsed|passed] [name=*ident*] [tag=*ident*] [not-inside=*"tag list"*]> content </actor>
- actor-attrs -- <actor empty handle="Actor_attrs" tag="actor-attrs" >
  <actor-attrs name=*"name"*>
- actor-doc -- <actor empty handle="Actor_doc" tag="actor-doc" >
  <actor-doc name=*"name"*>
- actor-dscr -- <actor empty handle="Actor_dscr" tag="actor-dscr" >
  <actor-dscr name=*"name"*>
- actor-names -- <actor empty handle="Actor_names" tag="actor-names" >
  <actor-names [tag=*id*]>
- actor-syntax -- <actor empty handle="Actor_syntax" tag="actor-syntax" >
  <actor-syntax name=*"name"*>
- add-markup -- <actor parsed handle="Add_markup" tag="add-markup" >
  <add-markup>text</add-markup>
- agent-criteria -- <actor empty handle="Agent_criteria" tag="agent-criteria" >
  <agent-criteria [name=*ident*]>
- agent-home -- <actor empty handle="Agent_home" tag="agent-home" >
  <agent-home name=*ident* [link]>
- agent-install -- <actor parsed handle="Agent_install" tag="agent-install" >
  <agent-install name=*ident* [type=*ident*]>...</agent-install>
- agent-list -- <actor empty handle="Agent_list" tag="agent-list" >
  <agent-list [type=*type*][subs]>
- agent-options -- <actor empty handle="Agent_options" tag="agent-options" >
  <agent-options [name=*"agent-name"*]>
- agent-remove -- <actor empty handle="Agent_remove" tag="agent-remove" >
  <agent-remove name=*"agent-name"*>
- agent-running -- <actor empty handle="Agent_running" tag="agent-running" >
  <agent-running name=*"agent-name"*>
- agent-set-criteria -- <actor parsed handle="Agent_set_criteria" tag="agent-set-criteria" >
  <agent-set-criteria name=*"agent-name"*>query_string</agent-set-criteria>
- agent-set-criterion -- <actor empty handle="Agent_set_criterion" tag="agent-set-criterion" >
  <agent-set-criterion name=*"name"* [value=*"value"*] [agent=*"agent-name"*]>
- agent-set-options -- <actor parsed handle="Agent_set_options" tag="agent-set-options" >
  <agent-set-options [name=*"agent-name"*]>options</agent-set-options>
- difference -- <actor parsed handle="Difference" tag="difference" >
  <difference>n1 n2 ... </difference>
- element -- <actor empty handle="Element" tag="element" >
  <element tag=*ident* [empty] [not-inside=*"list of tags"*]>
- equal -- <actor parsed handle="Equal" tag="equal" >
  <equal [not] [case] [text] [numeric]>list...</equal>
- expand -- <actor parsed handle="Expand" tag="expand" >
  <expand [protect [markup]]>content</expand>
- foreach -- <actor quoted handle="Foreach" tag="foreach" >
  <foreach list=*"list"* [entity=*ident*]>element</>

40
- get -- <actor empty handle="Get" tag="get" >
  <get [name=*"name"*] [pia|agent|form|trans|env|element[tag=*tag*]|local|global | [file=*"filename"*|href=*"url"*|[file|href] name=*"string"* ] >
- get.agent -- <actor empty handle="Get_agent" tag="get.agent" >
  <get-agent [agent=*"agent-name"*] name=*"name"*>
- get.env -- <actor empty handle="Get_env" tag="get.env" >
  <get.env [name=*"name"*]>
- get.form -- <actor empty handle="Get_form" tag="get.form" >
  <get.form [name=*"name"*]>
- get.pia -- <actor empty handle="Get_pia" tag="get.pia" >
  <get.pia [name=*"name"*]>
- get.trans -- <actor empty handle="Get_trans" tag="get.trans" >
  <get-trans [name=*"name"*]>
- if -- <actor parsed handle="If" tag="if" >
  <if><test>condition</test> <then>...</then><else>...& lt;/else></if>
- os-command -- <actor parsed handle="Os_command" tag="os-command" >
  <os-command [bypass]>command</os-command>
- os-command-output -- <actor parsed handle="Os_command_output" tag="os-command-output" >
  <os-command-output [bypass]>command</os-command-output>
- pad -- <actor parsed handle="Pad" tag="pad" >
  <pad width=*N* [align=[left|right|center]] [spaces]>...</pad>
- pia-exit -- <actor empty handle="Pia_exit" tag="pia-exit" >
  <pia-exit [status=*N*]>message</pia-exit>
- product -- <actor parsed handle="Product" tag="product" >
  <product>n1 n2 ... </product>
- protect -- <actor quoted handle="Protect" tag="protect" >
  <protect [markup]>content</protect>
- protect-result -- <actor parsed handle="Protect_result" tag="protect-result" >
  <protect-result [markup]>content</protect-result>
- quotient -- <actor parsed handle="Quotient" tag="quotient" >
  <quotient>n1 n2 ... </quotient>
- read -- <actor empty handle="Read" tag="read" >
  <read [ file=*"name"* [interform [agent=*"agentName"*]] [info|head|directory [links] [tag=*tag*] [all|match=*"regexp"*]] | href=*"url"* [resolve] ] [base=*"path"*] [process [tagset=*"name"*]] >
- read.file -- <actor empty handle="Read_file" tag="read.file" >
  <read.file file=*"name"* [interform [agent=*"agentName"*]] [quiet] [info|head|directory [links] [tag=*tag*] [all|match=*"regexp"*]] [base=*"path"*] [process [tagset=*"name"*]] >
- read.href -- <actor empty handle="Read_href" tag="read.href" >
  <read href=*"url"* [resolve] [base=*"path"*] [process [tagset=*"name"*]] >
- repeat -- <actor quoted handle="Repeat" tag="repeat" >
  <repeat list=*"..."* [entity=*"name"*]>...</repeat>
- set -- <actor parsed handle="Set" tag="set" >
  <set name=*"name"* [copy] [ pia | agent [hook] | trans [feature] | env | [element [tag=*ident*] | entity [global | local] ]>...</set>

41
- set.agent -- <actor parsed handle="Set_agent" tag="set.agent" >
  <set.agent name=*"name"* [hook] [copy]>...</set.agent>
- set.env -- <actor parsed handle="Set_env" tag="set.env" >
  <set.env name=*"name"* [copy]>...</set.env>
- set.pia -- <actor parsed handle="Set_pia" tag="set.pia" >
  <set.pia name=*"name"* [copy]>...</set.pia>
- set.trans -- <actor parsed handle="Set_trans" tag="set.trans" >
  <set.trans name=*"name"* [copy] [feature|header]>...</set.trans>
- sort -- <actor parsed handle="Sort" tag="sort" >
  <sort [case][text][numeric][reverse]>item, ...</sort>
- sorted -- <actor parsed handle="Sorted" tag="sorted" >
  <sorted [case][text][numeric][reverse]>item, ...</sorted>
- submit-forms -- <actor parsed handle="Submit_forms" tag="submit-forms" >
  <submit-forms [hour=*hh*] [minute=*mm*] [day=*dd*] [month=["name"|mm]]
  [weekday=["name"|n]] [repeat=*count*] [until=*mm-dd-hh*]> <a
  href=*"query"*>...</a>|...form...</sub mit-forms>
- subst -- <actor parsed handle="Subst" tag="subst" >
  <subst match=*"pattern"* result=*"string"*>text</subst>
- sum -- <actor parsed handle="Sum" tag="sum" >
  <sum>n1 n2 ... </sum>
- tagset-include -- <actor empty handle="Tagset_include" tag="tagset-include" >
  <tagset-include name=*tagset-name*>
- test -- <actor parsed handle="Test" tag="test" >
  <test [iftrue=*"value"*] [iffalse=*"value"*] [not] [text|link]
  [zero|positive|negative|null|match=*"pattern"* [exact] [case]]>
- text -- <actor parsed handle="Text" tag="text" >
  <text>content</text>
- trans-control -- <actor parsed handle="Trans_control" tag="trans-control" >
  <trans-control>...</trans-control>
- trim -- <actor parsed handle="Trim" tag="trim" >
  <trim [all]>content</trim>
- user-message -- <actor parsed handle="User_message" tag="user-message" >
  <user-message>content</user-message>
- write -- <actor parsed handle="Write" tag="write" >
  <write [file=*"name"* [interform] [append] | href=*"url"* [post]] [base=*"path"*] [trim]
  [line] [copy [protect [markup]]] >content</write>
- write.file -- <actor parsed handle="Write_file" tag="write.file" >
  <write.file file=*"name"* [interform] [append] [base=*"path"*] [trim] [line] [copy
  [protect [markup]]] >content</write.file>
- write.href -- <actor parsed handle="Write_href" tag="write.href" >
  <write.href href=*"url"* [post] [base=*"path"*] [trim] [line] [copy [protect
  [markup]]] >content</write.href>

Element Index

- base -- <element empty name="base" tag="base" >
- br -- <element empty name="br" tag="br" >
- caption -- <element name="caption" tag="caption" >

42
- dd -- <element name="dd" tag="dd" >
- dir -- <element name="dir" tag="dir" >
- dl -- <element name="dl" tag="dl" >
- dt -- <element name="dt" tag="dt" >
- else -- <element quoted name="else" tag="else" >
- hr -- <element empty name="hr" tag="hr" >
- img -- <element empty name="img" tag="img" >
- input -- <element empty name="input" tag="input" >
- li -- <element name="li" tag="li" >
- link -- <element empty name="link" tag="link" >
- menu -- <element name="menu" tag="menu" >
- ol -- <element name="ol" tag="ol" >
- option -- <element name="option" tag="option" >
- p -- <element empty name="p" tag="p" >
- select -- <element name="select" tag="select" >
- set.form -- <element parsed handle="Set_form" tag="set.form" >
- tagset -- <element parsed handle="Tagset" tag="tagset" >
- td -- <element name="td" tag="td" >
- textarea -- <element name="textarea" tag="textarea" >
- th -- <element name="th" tag="th" >
- then -- <element quoted name="then" tag="then" >
- tr -- <element name="tr" tag="tr" >
- ul -- <element name="ul" tag="ul" >

Copyright © 1997, 1998 Ricoh California Research Center
$Id: tag_man.if,v 1.8 yyyy/mm/dd hh:mm:ss steve Exp $

Appendix B.

List of Defined Entities

| Name | Value |
|---|---|
| actorNames | -eval-perl- -foreach- actor actor-attrs actor-dscr add-markup agent-... |
| agentName | InterForm |
| agentNames | Agency CDRW DOFS InterForm Logo My PIA archive backup publish shared |
| agentType | InterForm |
| date | 970523 |
| day | 23 |
| dayName | Friday |
| entityNames | actornames agentname agentnames agenttype date day dayname entitynam |
| fileName | entities.if |
| filePath | ../../../Agents/InterForm/entities.if |
| hour | 13 |
| minute | 57 |
| month | 5 |
| monthName | May |
| piaDIR | |
| piaHOME | /home/wolff |
| piaHOST | ookami |
| piaPORT | 8001 |
| piaUSER | Wolff |
| second | 26 |
| time | 13:57 |
| transAgentName | InterForm |
| transAgentType | InterForm |
| url | /InterForm/entities.if |
| urlPath | /InterForm/entities.if |
| urlQuery | |
| weekday | 5 |
| year | 1997 |
| yearday | 142 |

What is claimed is:

1. A method of processing an input structured document to form an output document being the interpreted result of the input structured document, the method comprising the steps of:
   a) initializing an input parser, including initializing an parser cursor to point to an initial element of the input structured document;
   b) initializing an element processor to couple an element input of the element processor to the input parser to accept a current element from the input parser and to couple an element output of the element processor to an output generator;
   c) initializing a definitions table coupled to the element processor;
   d) accepting a sequence of elements from the input parser and for each element, processing the element by the steps of:
      1) inputting the element from the element input of the element processor;
      2) determining whether the element is an active element or a passive element;
      3) if the element is a passive element, evaluating the passive element using applicable definitions from the definitions table and passing a result of the evaluation to the element output;
      4) if the element is an active element, performing the steps of:
         i) coupling the element output to an input of an active element queue; and
         ii) evaluating the active element using applicable definitions from the definitions table and passing a result of the evaluation to the element output;
      5) if the active element queue is not empty, coupling the element input to an output of the active element queue; and
      6) if the active element queue is empty and the element input is not coupled to the input parser, coupling the element input to the input parser; and
   e) using the output generator to generate the output document.

2. The method of claim 1, wherein the output document is a null document when each element processed evaluates to a null string.

3. The method of claim 1, wherein the input structured document, the output document and the definitions table are each represented in a common structured document format.

4. The method of claim 3, wherein the common structured document format is Standardized General Markup Language (SGML).

5. The method of claim 1 wherein the step of determining whether the element is an active element or a passive element comprises the steps of:
   a) comparing an element identifier with a table of active tags;
   b) if a matching active tag is found in the table of active tags, identifying the element as an active element; and
   c) if a matching active tag is not found in the table of active tags, identifying the element as a passive element.

6. The method of claim 5, wherein the step of comparing is a step of comparing an element identifier with active tags found in the definitions table.

7. The method of claim 1, wherein the step of evaluating a passive element comprises the steps of:
   a) substituting applicable definitions from the definitions table for tokens in the passive element; and
   b) evaluating primitive expressions in the passive element, if any are present in the passive element.

8. The method of claim 1, wherein the step of evaluating a passive element comprises the steps of:
   a) testing the element against a set of passive actor criteria; and
   b) if the element matches a criterion of a passive actor, calling a passive actor method for each passive actor matched.

9. The method of claim 1, wherein the step of evaluating an active element comprises the steps of:
   a) substituting applicable definitions from the definitions table at least for passive tokens in the active element;
   b) evaluating primitive expressions in the active element, if any are present in the active element; and
   c) calling an active actor action method with the active element as a parameter.

10. A method of processing an input structured document with an active document interpreter to form an output document, the method comprising the steps of:
    a) parsing the input document into a parse sequence comprising a sequence of elements, wherein elements include start tags, end tags and entity references;
    b) for each element encountered in the parse sequence, performing the steps of:
       1) determining whether the element is a passive element or an active element, wherein an active element is an element having an associated handler in a handler database maintained by the active document interpreter;
       2) determining whether the element has child elements in the parse sequence;
       3) if the element is a passive element and does not have child elements, providing the passive element to an output process;
       4) if the element is a passive element and has child elements, processing any child elements according to step b), recursing as needed;
       5) if the element is an active element and does not have child elements, providing the active element to the output process;
       6) if the element is an active element and has child elements, processing any child elements according to the steps of:
          i) processing the child elements according to step b), recursing as needed; and
          ii) routing any elements output in step b)6)i to a storage queue; and
       7) if the storage queue is not empty, using the storage queue as a source of the parse sequence in lieu of the parsed input document until the storage queue is empty; and
    c) processing, at the output process, each element output to the output process, according to a defined set of output rules.

11. The method of claim 10, wherein the step of providing the passive element to the output process further comprises the steps of:
    a) determining if an entity reference for the passive element is defined in a set of entity definitions; and
    b) if the entity reference is defined in the set of entity definitions, outputting the corresponding entity value for the defined entity reference.

12. The method of claim 10, wherein steps a), b) and c) are performed substantially simultaneously such that the input structured document can be at least partially processed without reference to the entire input structured document.

13. The method of claim 10, wherein steps a), b) and c) are performed incrementally.

14. The method of claim 10, wherein the processing operations in steps a), b) and c) are represented in the same syntax as the input structured document.

15. The method of claim 10, wherein the handler database is represented in the same syntax as the input structured document.

16. An active document interpreter for processing an input structured document to form an output document wherein the input structured document is representable by a parse tree, the active document interpreter comprising:
   a) an input document tree traverser, which traverses the parse tree and outputs a current element upon request, wherein the current element is an element in the parse tree pointed to by a cursor;
   b) an element processor coupled to the input document tree traverser for processing elements output by the input document tree traverser;
   c) an output document tree constructor coupled to the element processor for constructing an output document tree from elements output by the element processor;
   d) a first element evaluator, within the element processor, for evaluating whether an input element is an active element or a passive element;
   e) a first router, within the element processor, for routing passive elements to an output stage of the element processor and active elements to an element queue;
   f) a second element evaluator, within the element processor, for identifying, in a definitions table, any corresponding entity replacement values for the input element; and
   g) a second router, within the element processor, for routing elements from the element queue to the second element evaluator and the output of the element processor when the element queue is not empty and for routing elements from the input document tree traverser to the element processor when the element queue is empty.

17. A method of processing input documents into output documents, comprising the steps of:
   a) parsing the input document into a sequence of element start tags, element end tags, entity references, and character strings;
   b) transforming the input document into a sequence of instructions, as follows:
      1) replacing each defined entity reference with a sequence of instructions that, when executed, outputs a defined replacement;
      2) replacing each element recognized as an active element with a sequence of instructions that, when executed, takes the output of the instructions corresponding to its attributes and contents as input and passes it to the sequence of instructions derived by this method from the definition of the active element;
      3) replacing each element recognized as representing a primitive operation with a sequence of instructions that, when executed, takes the output of the instructions corresponding to its attributes and contents as input and performs the indicated primitive operation on them; and
      4) replacing each unrecognized element start tag, element end tag, entity reference, and character string with a sequence of instructions that outputs it; and
   c) executing the resulting sequence of instructions to produce an output document.

\* \* \* \* \*